United States Patent [19]

Kerzner

[11] Patent Number: 4,853,855
[45] Date of Patent: Aug. 1, 1989

[54] DIPMETER PROCESSING TECHNIQUE

[75] Inventor: Mark G. Kerzner, Houston, Tex.

[73] Assignee: Halliburton Logging Services Inc., Houston, Tex.

[21] Appl. No.: 63,608

[22] Filed: Jun. 18, 1987

[51] Int. Cl.[4] .............................................. G01V 3/18
[52] U.S. Cl. ...................................... 364/422; 73/151
[58] Field of Search .................. 364/422; 73/151, 152; 324/333

[56] References Cited

U.S. PATENT DOCUMENTS

| | | | |
|---|---|---|---|
| 4,320,469 | 3/1982 | Frawley | 364/422 X |
| 4,355,357 | 10/1982 | Chan | 364/422 |
| 4,541,275 | 9/1985 | Kerzner | 364/422 X |
| 4,543,219 | 6/1984 | Clavier | 364/422 |

OTHER PUBLICATIONS

"Representation of Random Waveforms by Relational Trees", Erich, R. W. and Foith, J. P.,–IEEE Transactions, vol. C-25, No. 7, 7/76.
"Waveform Correlation Using Tree Matching"-Cheng, Y. C. and Lu, S. Y.-Proceedings of 7th Internation Conference on Pattern Recognition, vol. 1, 8/84.
"An Artificial Intelligence Approach to Well Log Correlation", Startzman, R. A. and Kuo, T. B.-The Log Analyst, Mar-Apr. 1987-pp. 175-183.

Primary Examiner—Jerry Smith
Assistant Examiner—Steven G. Kibby
Attorney, Agent, or Firm—William J. Beard

[57] ABSTRACT

A process for processing a dipmeter curve is shown in the preferred embodiment. In a curve, line segments are drawn between curve minima, a second set of line segments are drawn between minima in the first segments, and this is repeated to desired number of levels. When finished, line segments are numbered and become a branched tree. This tree is reorganized to form an event tree which is easily converted into a stored digital value and is processed for correlation with other curves.

13 Claims, 9 Drawing Sheets

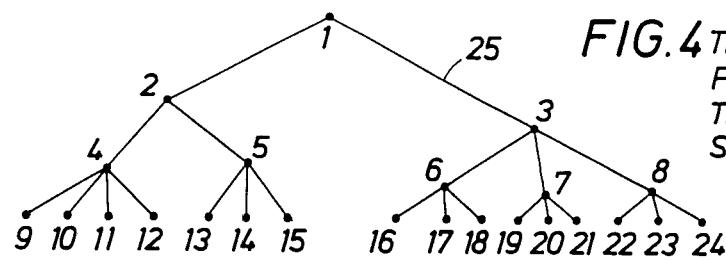
FIG. 4 TREE STRUCTURE REFLECTING THE RELATIONSHIP BETWEEN SEGMENTS IN FIG. 3
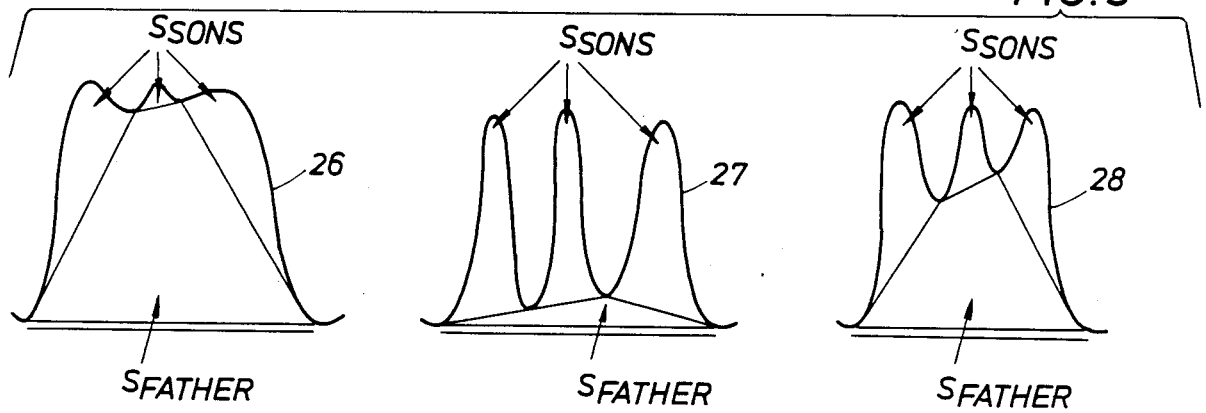
FIG. 5
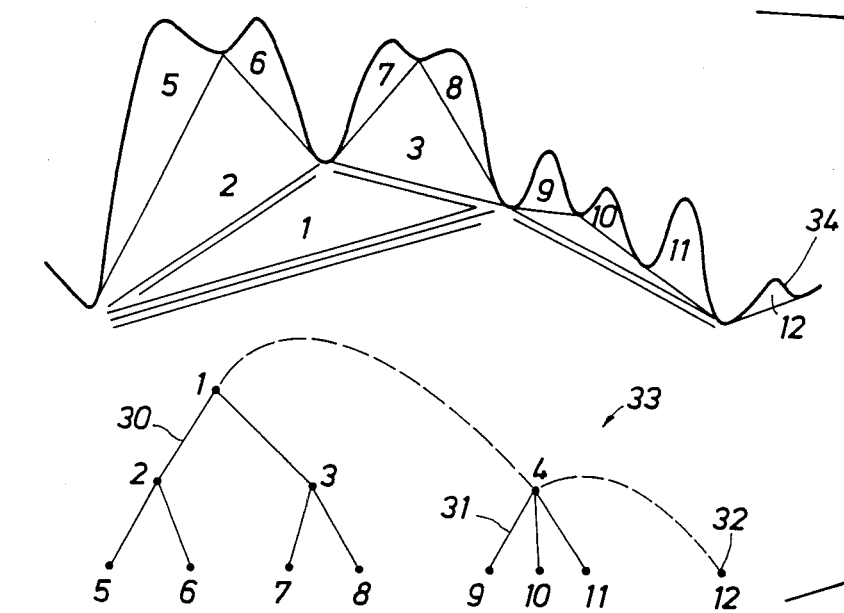
FIG. 6 SEGMENTATION OF A CURVE AND CORRESPONDING SUBTREE UNITED INTO ONE GRAPH
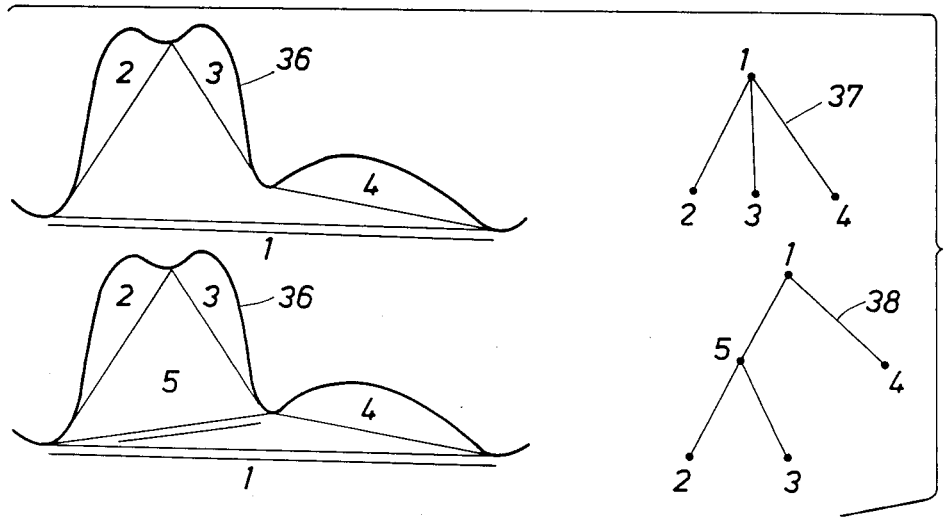
FIG. 7

FIG.10
FIG.11
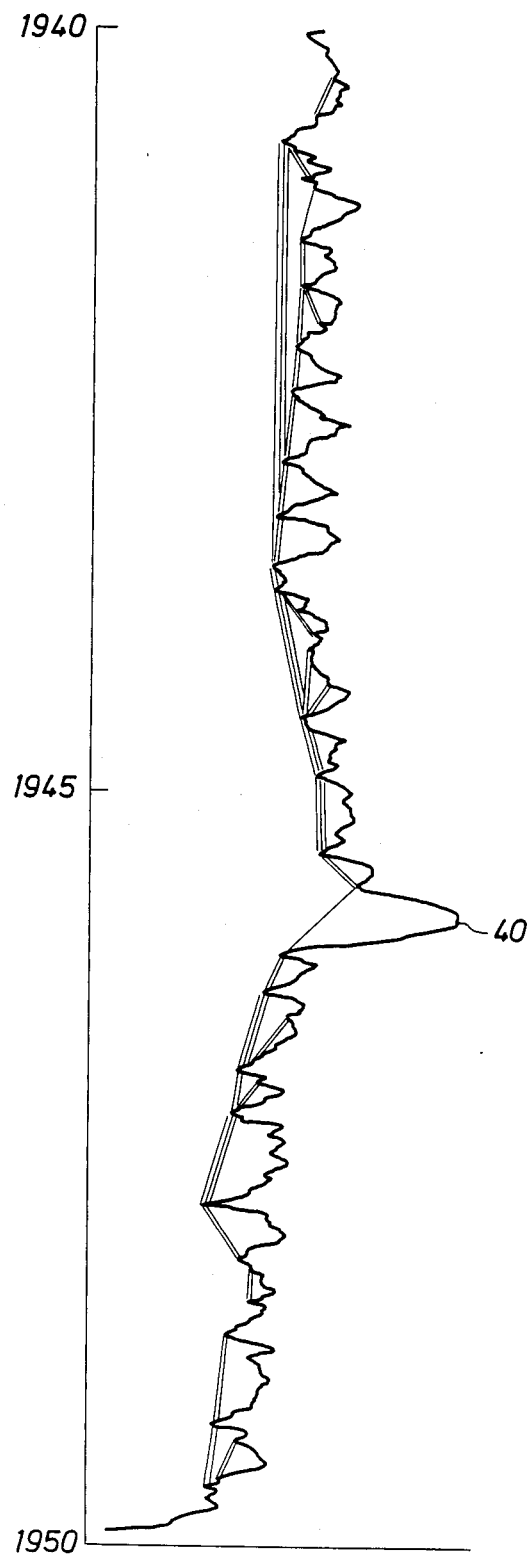
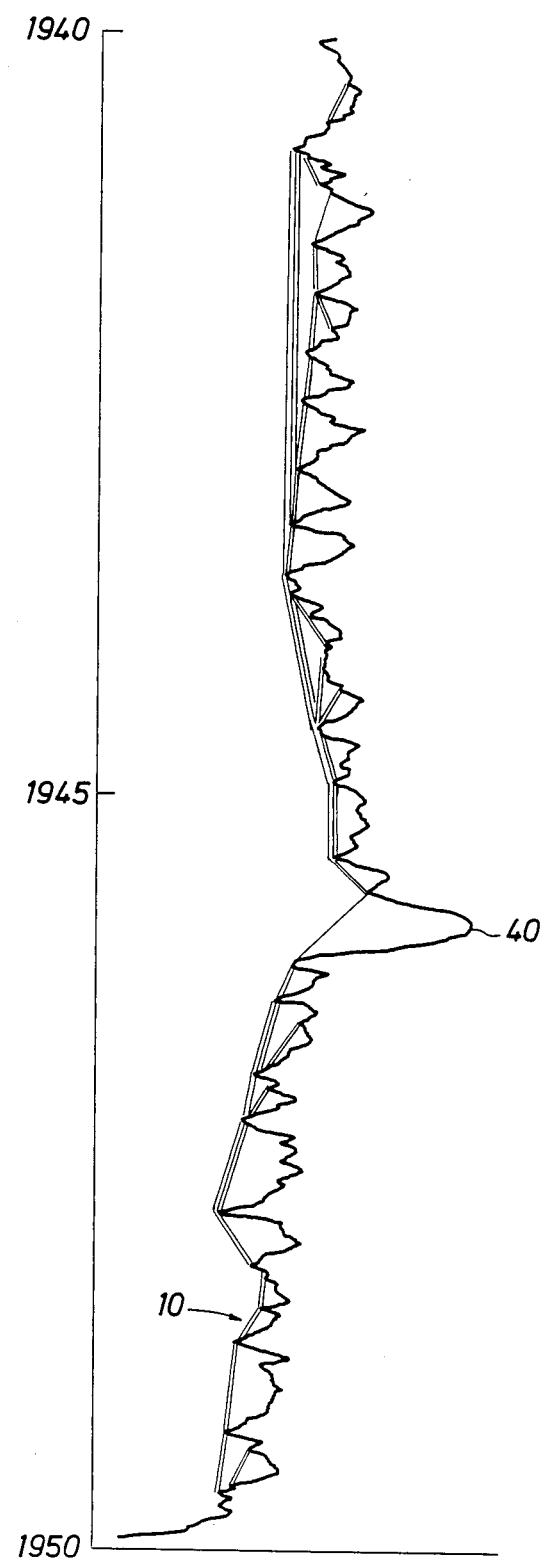

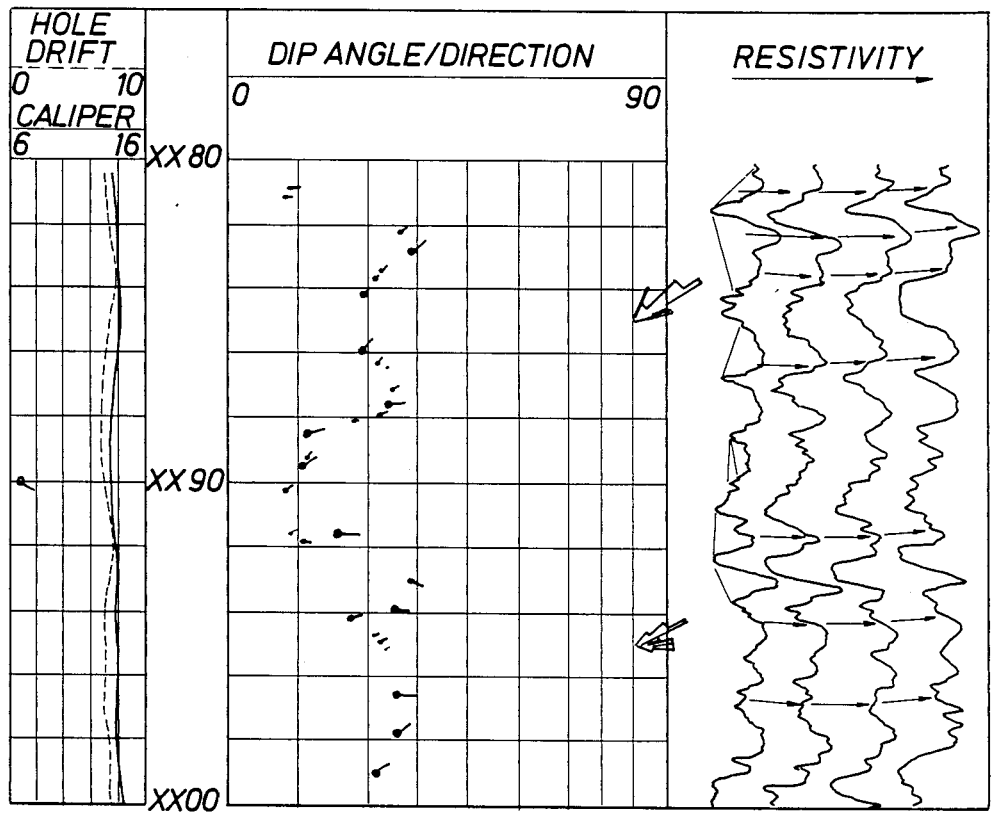
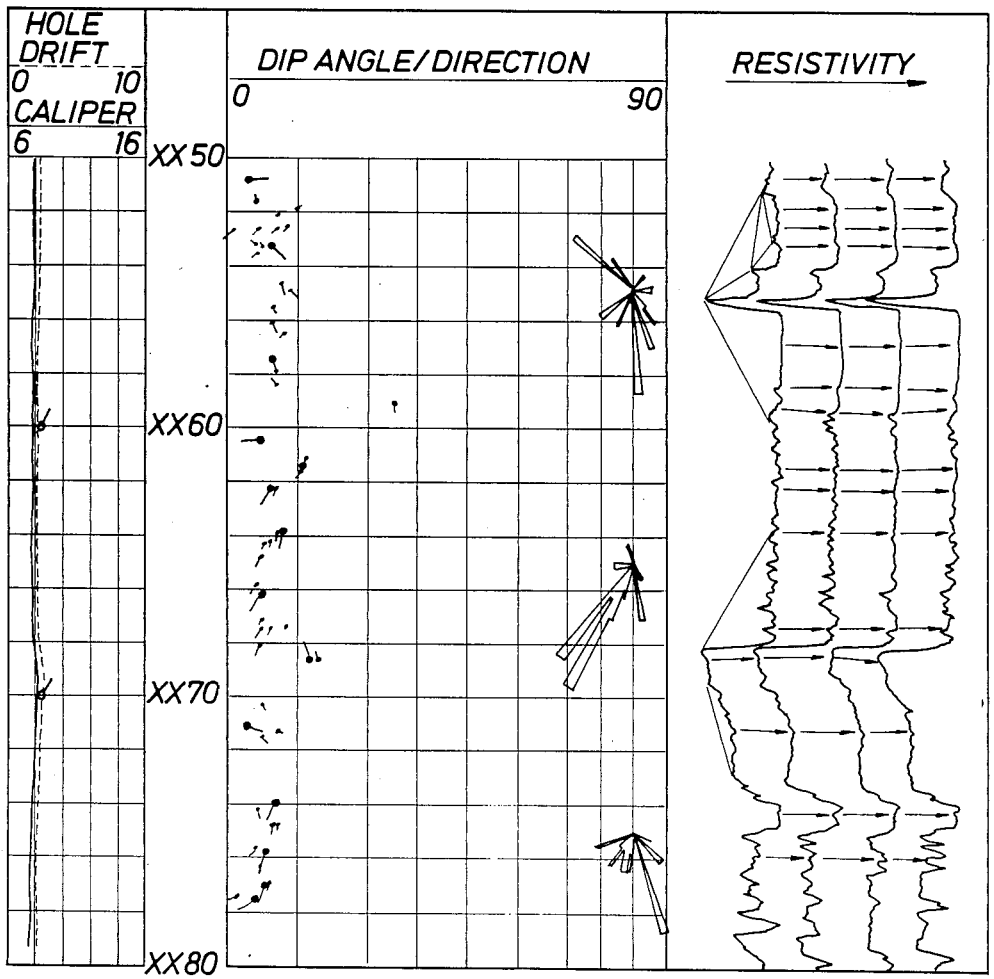

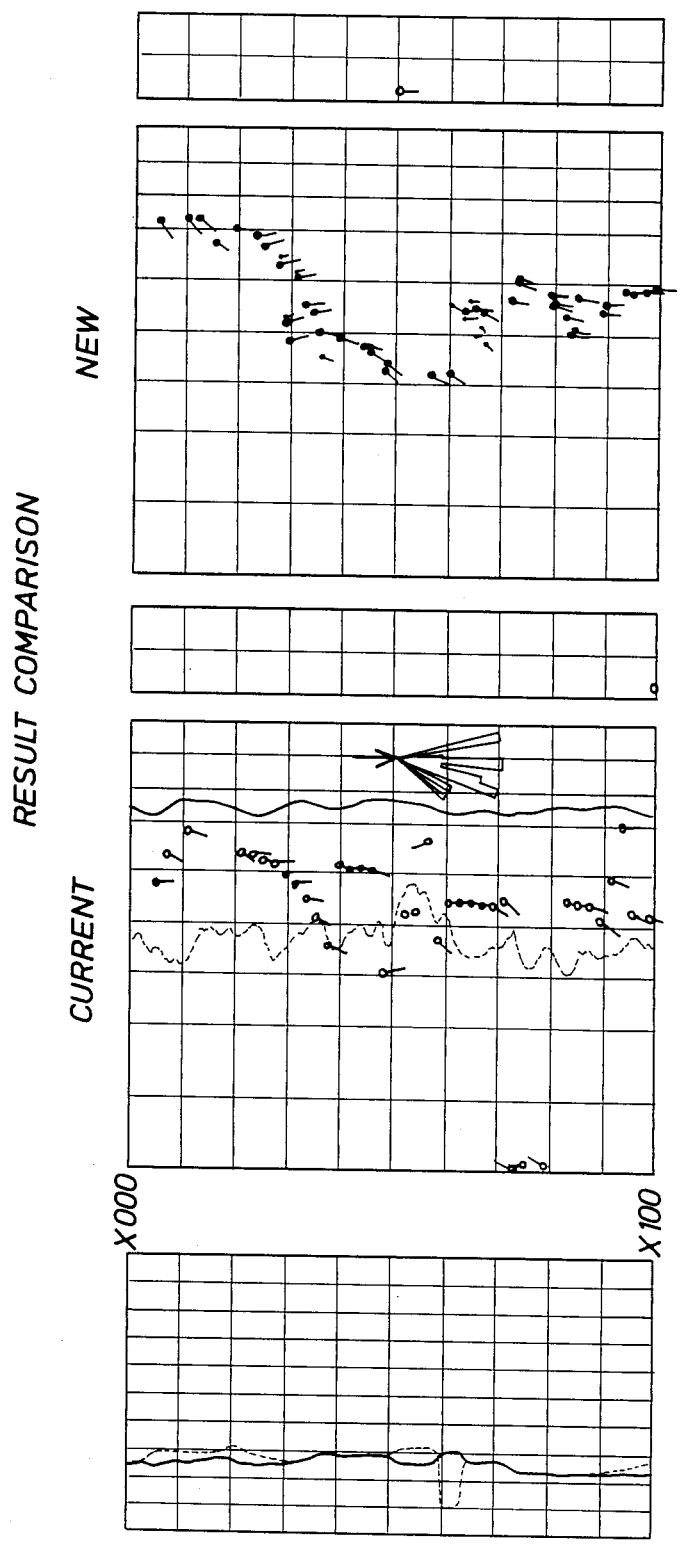
FIG. 14. COMPARISON BETWEEN THE FIXED-INTERVAL CORRELATION AND THE PRESENT PROCESS

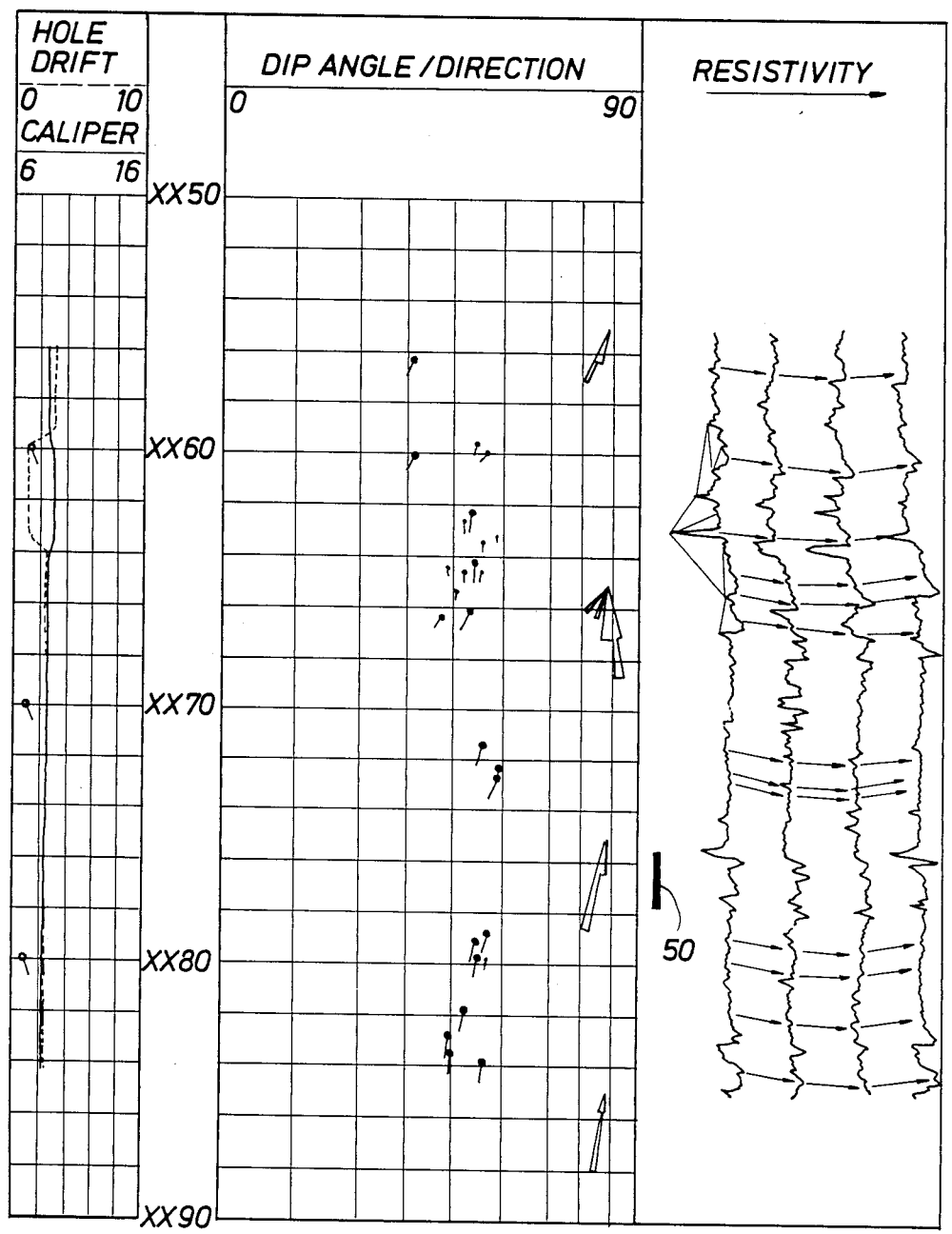
FIG. 15 INVESTIGATION OF COMPARISON IN FIG. 14

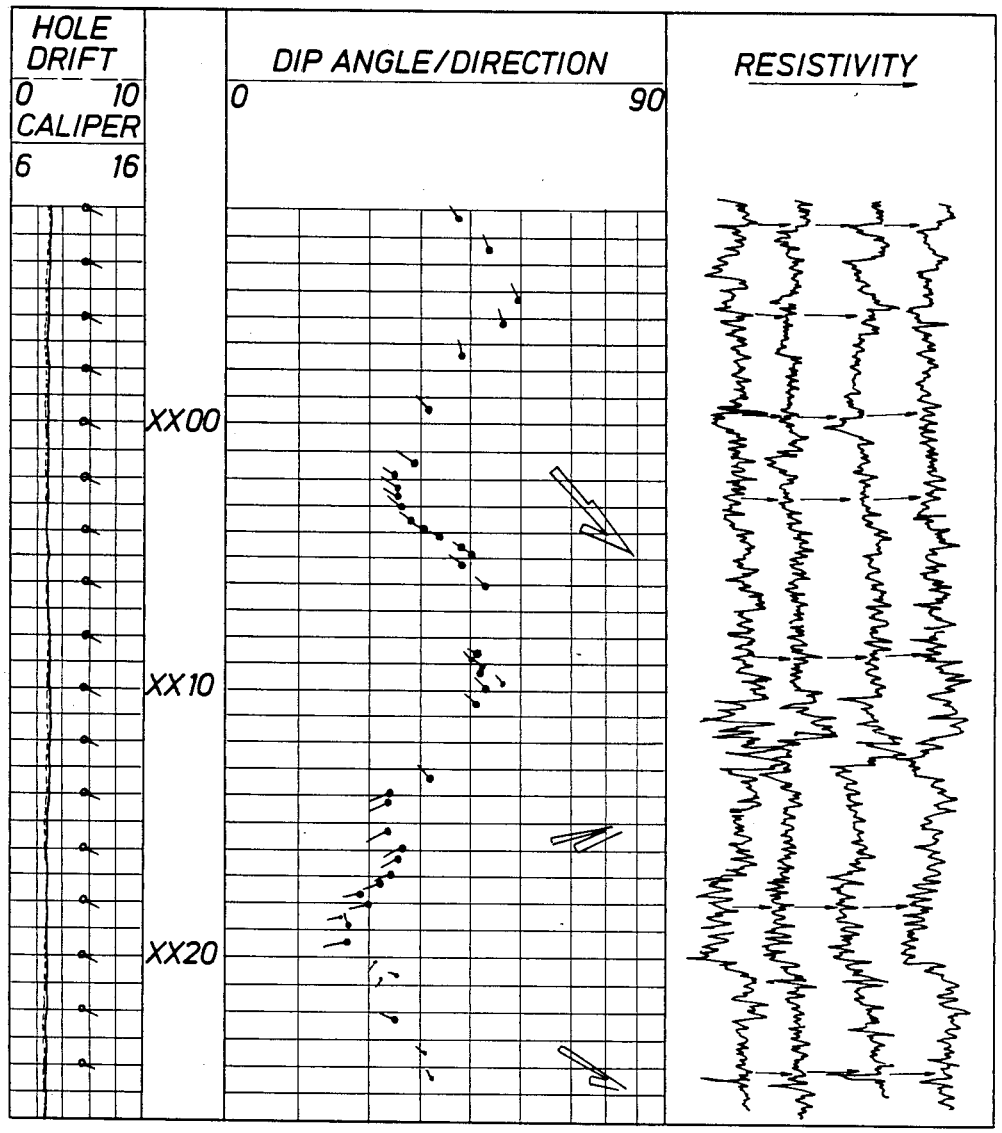
FIG.16 DIP DETERMINATION IN THIN BEDS

DIPMETER PROCESSING TECHNIQUE

BACKGROUND OF THE DISCLOSURE

In general terms, the optimum approach for interpreting well log data obtained by dipmeter is visual inspection and correlation by a skilled and experienced operator. The dipmeter analyst utilizes an optical device to shift and contrast two or more curves obtained from a dipmeter. Attempts to accomplish this by something other than human observation have been made in the past. Another approach is correlation of dipmeter logs by fixed interval correlation methods. The various and sundry mechanized correlation methods impose on the data the requirements for data free of noise, or what otherwise is termed as high quality data. The quality of data sometimes will vary in a fashion that poor quality cannot be overcome. For instance, the quality of data is dependent on downhole conditions which vary with a multiple of factors. The conditions impact the quality of curves presented for dipmeter interpretation. When such difficulties arise, as a practical matter, the only approach then left is optical correlation. Again, optical correlation may be the most accurate and desirable approach but it is also a good deal more expensive and tedious in that it requires an experienced human operator.

The present approach is able t o provide interpretation in the stead of fixed interval correlation techniques. In general terms, the approach of the present disclosure utilizes what are called segmentation trees with hierarchial multilevel optimization. These terms will be defined in greater sweep below.

The use of the generally described concepts implemented in the present apparatus and procedure enhance showings of dip angle and direction. Because there is a hierarchy of data, dynamic programming techniques are more readily applied.

DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 shows a tree structure representing the segments in the curve shown in FIG. 3;

FIG. 5 shows an approach for breaking events into subevents for ease of correlation involving relative contrasting areas;

FIG. 6 shows a profile curve and a segmentation tree arrangement wherein adjacent subtrees are united in a common segmentation tree;

FIG. 7 shows a simplified regrouping of subevents in a segmentation tree to provide additional events for analysis;

FIGS. 9, 10 and 11 shown the same profile curve which is segmented in FIG. 8, and which has selected events additionally marked in FIG. 9, event simplification in FIG. 10, and event selection in FIG. 11;

FIG. 12 is an example of dipmeter results utilizing the algorithm of the present disclosure;

FIG. 13 shows another result from the use of the present invention with different strata;

FIG. 14 is a set of data processed by the present algorithm in contrast with fixed interval correlation;

FIG. 15 is an expanded vertical scale of a portion of the data shown in FIG. 14 for increased emphasis;

FIG. 16 is dip determination for thin beds; and

DETAILED DESCRIPTION OF THE PRESENT DISCLOSURE

A dipmeter is a device which utilizes a measurement pad having a sensor thereon. Typically, four pads are arranged around the dipmeter located at 90° spacing. They make measurements of resistivity. The resistivity measurements are taken along a borehole. When a formation is encountered, it is observed at one of the pads before it is observed at the other pads assuming that the formation has dip. This is ordinarily the fact. The extent of dip can be determined by interpretation of the dipmeter data obtained from the multiple sensors. The preferred arrangement of four sensors provides four data traces for a typical borehole. They are analyzed by hand in one approach, the four data being plotted as curves on a common strip chart. The strip chart normally records the data as a function of depth so that one axis of the paper is depth in the well borehole. Optical analysis involves locating a common event in one curve and then in another curve. This is optically assisted by utilizing instruments which superimpose one curve over the other and which also permit lateral movement so that they can be shifted.

A fixed interval correlation has been described by Kemp in the 1980 paper entitled "An Algorithm for Automatic Dip Computation" *Computers and Geosciences,* Volume 6, Page 193-209. Various and sundry fixed interval correlation techniques are discussed in other references, Schoonover, Larry L., and Holt, O. R.: Computer Methods of Dip Log Correlation, paper SPE 3566 presented at the 1973 SPE Technical Conference and Exhibition, and Moran, J. H., Coufleau, M. A., Miller, G. K. and Timmons, J. P., "Automatic Computation of Dipmeter Logs Digitally Recorded on Magnetic Tapes", *J. Pet. Tech.* (1961), Vol. 14, No. 7, 771-82. In the various correlation strategies, event selection from a given profile curve is somewhat arbitrary and in many instances the event selection criteria differs from that which would prevail with an optical correlation utilizing an experienced analyst. Clearly, optical correlation is the better because it is not confined by arbitrary limitations such as specific lengths of curve, limiting analysis to predefined peaks, troughs or plateaus, etc.

When one looks at this problem in a broader light, it can be stated in general terms as breaking a curve into meaningful pieces. It has been found that the major impediment to analysis is that the curve can be organized into events of different relative sizes, and these sizes are set in advance. Accordingly, various schemes based on multiple scales had to be repeated for each selected scale. This approach, however, creates computational burdens.

The scheme of curve analysis suggested below is data-driven, rather than parameter-driven. This approach allows it to find simultaneously all meaningful events of all sizes. It is based on a simple geometrical procedure and on a number of rules extracted from the process of optical dipmeter correlation.

Figure 1:
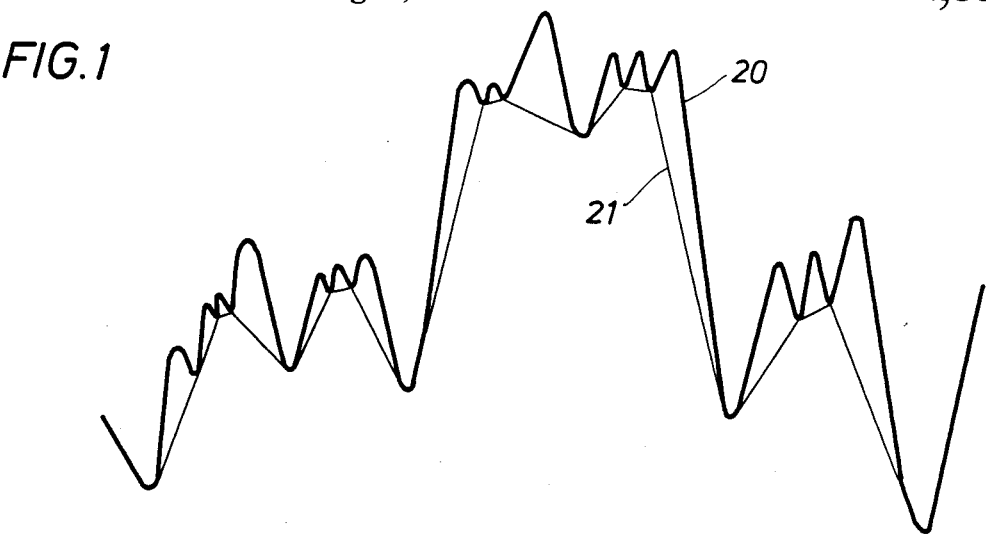
FIG. 1 is a profile curve from a sensor on a dipmeter where local minima are connected by segments of straight lines to initiate segmentation.
Figure 2:
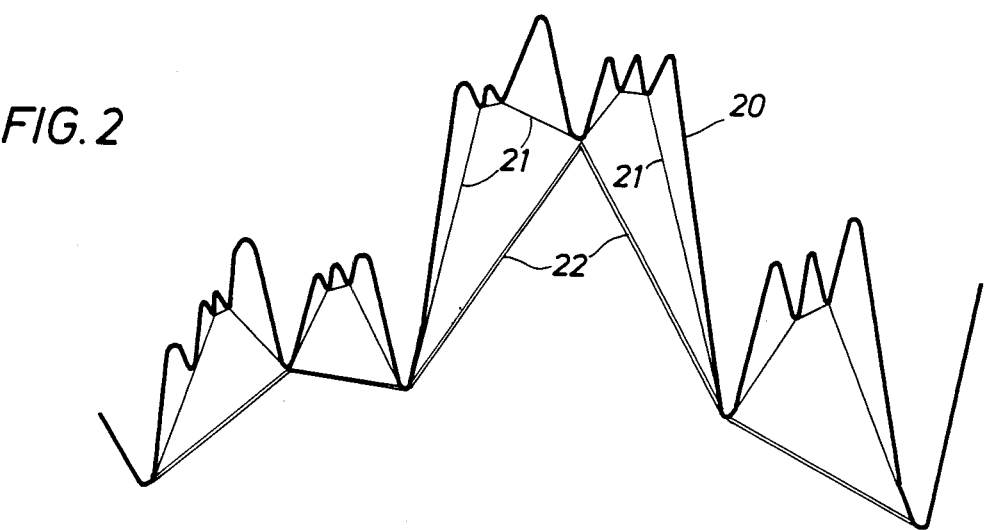
FIG. 2 shows the same curve of FIG. 1 with a double line connection to minima of the segments of FIG. 1.

Consider a curve 20, such as the one on FIG. 1, with all its local minima marked and connected by segments 21 of straight line. This connecting contour can be regarded as a first approximation to the initial curve. Similarly, one can find the local minima of the connecting line and connect them with the second-order connecting line 22, as in FIG. 2. The connecting line in FIG. 2, drawn as a double line, can be regarded as a second-order approximation to the initial curve. This process can be continued with third-order line 23, fourth-order line 24 and so on, until no two minima can be found on the last approximating line, as in FIG. 3.

Figure 3:
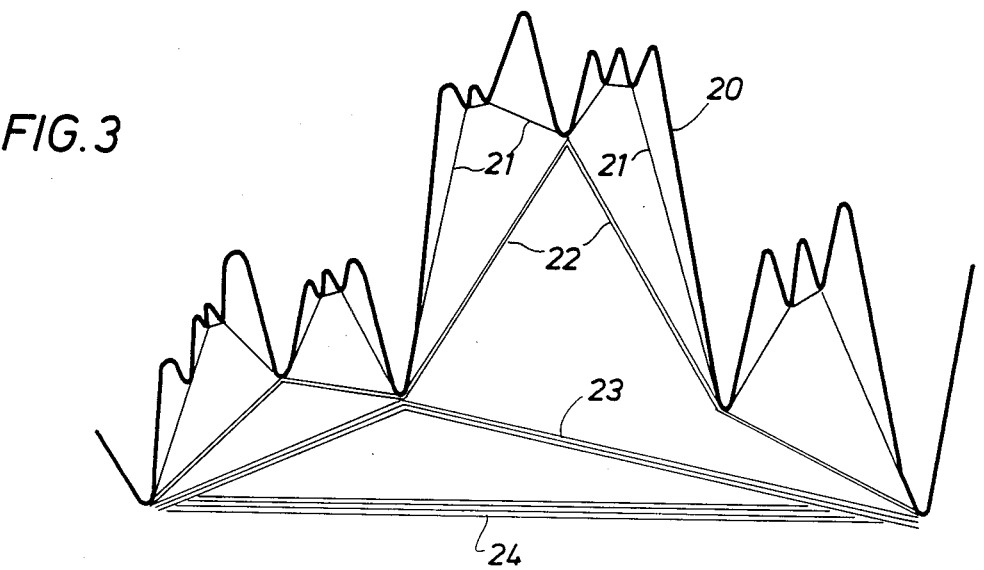
FIG. 3 shows further curve segmentation utilizing minima in the double line segments.
Figure 8:
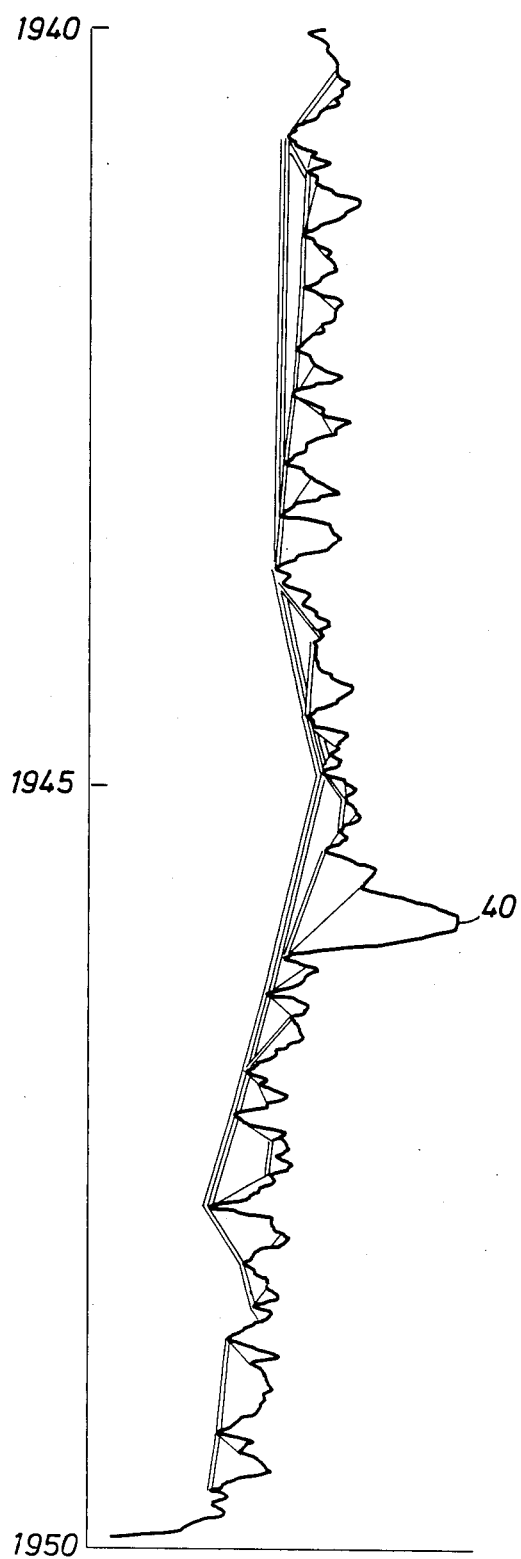
FIG. 8 shows an application of segmentation to a profile curve to assure event detection in the curve.
Figure 9:
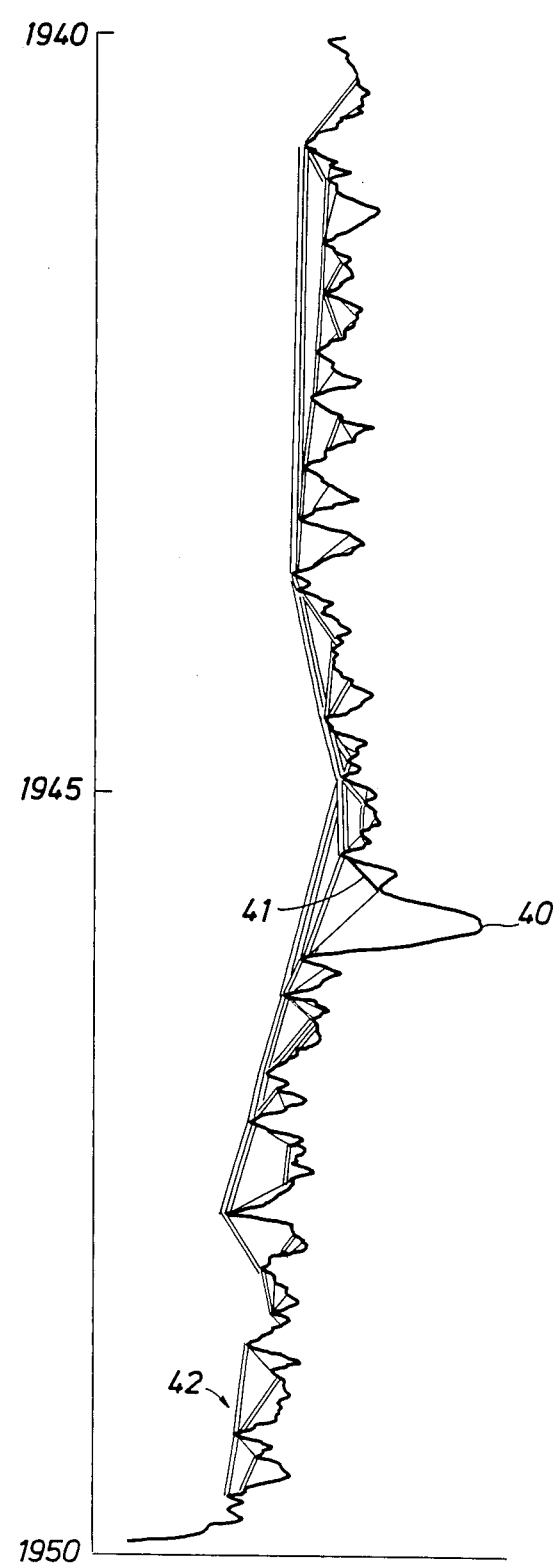

Notice that most apparently meaningful events are present in the resulting segmentation on FIG. 3 and are delineated by a single, double, or triple lines. After all line segments in FIG. 3 are numbered, their relationship can be represented by a tree diagram 25, such as the one shown in FIG. 4.

The segmentation described above and its associated tree structure are called a segmentation tree. It is important to realize that the initial curve is not substituted by approximation lines, rather, the lines serve only as a means of segmenting the curve, or breaking it into pieces; this explains the term segmentation tree.

As would seem clear, not every curve segment in a segmentation tree is important and can be used for correlation. A selection criterion can be formulated using the following simple consideration. Consider FIG. 5, where curves 26, 27 and 28 represent variations of one basic shape. The curve 26 is almost always considered as one whole event, curve 27 is almost always separated into two constituent events, while curve 28 is a transition case.

To distinguish between these cases in the algorithm, an area criterion is used. Let $S_{sons}$ denote the total area of the sons, and $S_{father}$ the area of the father, as shown in FIG. 5. $S_{sons}$ is determined as the sum of the areas under all son segments. In the curve 26, $S_{sons}$ is less than $S_{father}$; in the curve 27, $S_{sons}$ is greater than $S_{father}$; and in the curve 28 the areas are comparable.

Following the discussion above, the area comparison criterion for the selection of meaningful events can be formulated as follows: any event, for which $S_{father}$ is greater than $S_{sons}$ is correlated as a whole; any event for which $S_{father}$ is less than or equal to $S_{sons}$ will not be correlated as a whole, although its sons may be considered for correlation. It should also be noted that when an event is correlated as a whole, its sons may also be used for correlation.

Segmentation of a curve using segmentation trees and the area comparison criterion described above allows the algorithm to select the same events that would be considered as good candidates for correlation in optical processing. These ideas are general, however, in the sense that they provide the basis for event detection and will give satisfactory results in most, but not all cases. A number of additional rules, derived from the observation of optical processing, are used to improve the event detection. These rules are described below. Before proceeding with them, however, some consideration will be offered for the explanation and justification of the event detection scheme suggested above.

DISCUSSION OF THE EVENT DETECTION ALGORITHM

As one can notice, the basic curve elements used for correlation and for constructing more complex events are pieces of a profile curve from one local minimum to another, where the direction of curvature is upwards.

First, upward curvature is a preferred direction in optical correlation. Second, it corresponds to determining dip from resistive beds of those whose resistivity is higher than the resistivity of the surrounding beds. When the dipmeter is operated in saline, conductive muds, the resistivity is measured more precisely in resistive beds. In addition, the measurement taken against resistive beds is less impacted by the conductivity of the mud. Both considerations above lead to greater curve repeatability in resistive beds, making them more preferable for dip determination.

For some special cases of logging, however, this situation is reversed, and correlation should be done primarily on conductive beds. Since the dip results depend to some extent upon the selection of resistive or conductive beds for correlation, the option for their selection has been implemented in the program. It is called the oil-based option, and it is primarily used for dipmeter logs recorded in oil-based muds, although it can be applied to any log. Technically it means event selection based on local curve maxima, rather than minima, and it is implemented by inverting the base curve values and searching it again for local minima.

It must also be noted that there is a certain quality of a resistivity measurement which makes the suggested scheme particularly effective. It has been noticed that, as a sensor goes out of a resistive bed, the measurement usually exhibits a small overshoot. Due to this a resistive bed becomes delineated by two local minima on the upper and lower side, thus providing the minima needed for curve segmentation.

ADDITIONAL STEPS FOR EVENT DETECTION

There are a number of additional steps, which make the event detection scheme, based on segmentation trees and area comparison, more precise and adapt it particularly to the task of dipmeter correlation. Some of these are technical in nature while some are practical, and have been formulated by analyzing the process of optical correlation. Following are certain technical rules.

TREE STRUCTURE

The tree describing the relationships between events on the curve is not a single tree with one root, but rather a collection of trees because, at the end of the curve interval, some events of the lower level do not group to form an event of a higher level. An exemplary structure is illustrated in FIG. 6. This figure also shows how the subtrees 30, 31 and 32 are joined into one connected tree from the curve 34.

TREE GROUPING

Some events that appear as a unity (in optical analysis) do not come out as a unity in the segmentation tree;

instead, they are either broken up or are united with other events. This situation is illustrated in FIG. 7. The curve 36 develops the tree 37 at the right. From this example, an operation called grouping is introduced. This operation checks all possible combinations of events belonging to one father and tests them using the area comparison criterion described above. Any group that passes the test (i.e. has the area of the father event greater than the sum of the areas of the son events) is marked as an event, and this event is added to the segmentation tree 38, as illustrated in FIG. 7.

TREE MARKING

This step refers to means marking those events in the segmentation tree that are considered as good candidates for correlation. It is accomplished using the area comparison criterion described above. All events of level 2 (see FIG. 2) and higher are tested against this criterion and are marked for correlation if they pass the test. All events of level 1 are marked for correlation unless they are marked down by any other rule that prohibits using them. Examples of such rules are given below. Depending upon the curve character, the number of events marked for correlation constitutes from 50% to 10% of the total number of events in the segmentation tree.

TREE REDUCTION

Since not all events are selected for correlation, the initial tree structure is changed after the tree is marked. When all unnecessary events are deleted, and all new connections between them are recorded, the new, reduced tree contains only events that make good candidates for correlation. The initial segmentation structure is, therefore, called a segmentation tree and the final structure, with many unnecessary events eliminated, is called an event tree. Using the event tree instead of the segmentation tree is also helpful for saving computer time and memory.

The steps described above for making the segmentation tree complete, for grouping, for marking, and for reducing the tree, together with a few less significant steps given below, serve to adjust the initial segmentation algorithm and to make event selection closer to the one done in optical analysis. These rules relate to the internal work of the algorithm.

There are also, as has already been mentioned, practical steps, taken directly from observation of optical correlation. Examples of these rules are listed below

EVENT SIZE

The width of an event considered for correlation should be no less than 0.2 feet (0.6 cm) and no more than 5 feet (1.6 m). The lower limit is introduced because, with diminishing size of events, the possibility of miscorrelation increases. The upper limit comes from experience in log analyzing and knowledge of the area logged. It is also explained by the goal of looking for precise, and not averaged, dip; thick beds usually consist of several sub-beds, each with its own dip. When using beds that are too thick, one may loose information.

ALLOWING NO FURTHER DIVISION OF AN EVENT

When an event is small and consists of a number of even smaller events, insignificant when compared to the main event, it should not be subdivided further, and its constituent events should not be correlated. This rule prevents the algorithm from correlating insignificant curve variations. It is expressed using the language of segmentation trees, by a number of subrules, for example: if the event level is 2, its own area $S_{father}$ is 2 times greater than the area of its sons $S_{sons}$, and its width is less than 1 foot (0.3 m), then the event is not further subdivided.

REUNITING EVENTS

If an event was not selected for correlation, for example, because it did not pass the area comparison test, but none of its constituent events at any level has been selected because of a different step, then the event in question is nevertheless marked for correlation. This rule, therefore, overrides the work of some of the rules above.

EXAMPLES AND IMPLEMENTATION OF CURVE SEGMENTATION

An example of the use of the present algorithm is shown in FIGS. 8–11 inclusive. The curve 40 is illustrated to show first, second and third levels of curve segmentation. By contrast, the same curve 40 is now shown in FIG. 9 where additional segmentation is made by the additions at 41 and 42. In other words, additional markings have been made to show added events. This is more apparent from the contrast of FIG. 8 with FIG. 9.

As stated above, not every marked event is useful. The events that are important are illustrated in FIG. 10 where the curve 40 has been simplified. That is, the segmentation tree has in large measure been simplified to reduce the marking and thereby obtain only those events which are more useful for correlation. Going now to the companion curve at FIG. 11, again, the curve 40 is reproduced. A less important change has occurred in the region 45 in FIG. 11 and is a simplification illustrated in the transition from FIG. 10 to FIG. 11 can not be seen in the, figures, but is reflected in the data structure stored in the computer.

EVENT CORRELATION

Event correlation is the next step of the algorithm. In this stage events marked on one curve, which is from now on called a base curve, are correlated to the other curves. The correlation is implemented in a hierarchical multilevel optimization process; this allows the algorithm to take into account as many interdependencies between events and corresponding correlations as can be identified. Event correlation can be broken into four steps.

STEP #1

The first step is to determine all correlation choices for each event. This is done by computing a correlogram (a plot of correlation coefficients, measuring curve similarity, versus all possible displacements) and by selecting displacements corresponding to all local maxima of this correlogram, where the value of the correlation coefficient exceeds a certain threshold. These possible displacements from curve pairs 1-2, 1-3, and 1-4 are then combined, and for all combinations planarity is checked. The value of planarity cutoff is determined by known statistical and area geological considerations. All found correlations between all four pads are then recorded.

It may be noted here that all correlations found for an event refer to this event. It is therefore logical to store this information as part of this event's record. All event records in the event tree, when copied from a segmentation tree, are supplied for storing correlations. Typical computer protocol involves use of a scratch pad memory.

STEP 190 2

The second step in event correlation is called family optimization. To explain this step, consider an event in the event tree which contains subevents, called sons. Obviously, any correlation choice of the son event should agree with the correlation choice of the father. The agreement can be formulated as a requirement that the correlation of the sons should not conflict with the correlation of the father. Even then, for each correlation choice of the father there may be a few possible correlation choices for the sons, all agreeing with that of the father.

Therefore, in this step for each correlation choice of the father, the best combination of sons' correlations is determined. This is done by solving the following optimization relationship of equation (1):

$$\sum_{s=1}^{M-1} \sum_{i=2}^{4} \left| d_{1i}^{s+1} - d_{1i}^{s} \right| + k \cdot \sum_{p=1}^{N} 1/3 \, o \sum_{i=2}^{4} C_{1i}^{p} \rightarrow \min, \quad (1)$$

where $$d_{1i}^{s}$$

is displacement between curve 1 and i in the correlation choices s;

$$C_{1i}^{p}$$

is the correlation coefficient for correlation choice p;

M is the number of correlation choices of sons (no more than one choice per son) selected for the given correlation of the father;

N is the number of correlation choices that are left out;

k is a proportionality coefficient discussed later;

indices $s=1, 2, \ldots, M$ indicate selected correlations;

indices $p=1, 2, \ldots, N$ indicate correlations that are not selected.

Equation (1) selects the most consistent combination of sons' correlations for a given correlation of the father. Naturally, no correlations are allowed to cross. When a certain son correlation is inconsistent or is not consistent enough with the other sons' choices, it is skipped. Differences between displacements are used as a measure of consistency. Correlation coefficients are used as a measure of importance for each correlation choice.

The solution to the problem in equation (1) is obtained using dynamic programming. A general problem of this kind and its particular applications are treated in detail by Kerzner, "Image Processing in Well Log Analysis", IHRDC, Boston (1986), where the algorithms for their solution are also given.

When the solution to equation (1) is found, correlation coefficients of selected son correlations are added to the correlation coefficient of the father correlation, thereby increasing its importance. This step imitates giving more importance to those matches that repeat in detail, and not only in general shape.

The proportionality coefficient k in equation (1) influences the scatter of resulting correlations. When the value of the coefficient is increased, the scatter is increased; when the value is diminished, the correlation progression becomes more gradual. However, the correlation progression can not be made much more gradual or more scattered than the data actually indicate. The solution is not very sensitive to the changes in k, and the increase or decrease of k by a factor of 2 almost does not change the result. The correct value of k is established through experimentation or is known for a given geological region.

The results computed in Step 2 are recorded in the scratch pad of each event, which is prepared in Step 1.

STEP #3

Step 3 in the correlation process is called optimization of correlations for senior events. In this step, the correlations for all senior events in the event tree are found. Senior events are defined as all events that do not have a father. Some of these events are indeed large events with a number of descendants, while some are merely low level events at the end of the depth interval; the majority of senior events, however, do have families, and their families have been optimized in the previous step, Step 2.

Since the families were optimized in Step 2, conditional correlations have been computed; for each correlation choice of a senior event, the algorithm has decided which combination of correlation choices of sons is in the best agreement with the correlation of the senior event, and the coefficients of importance have been modified accordingly. Using this information, it is now possible to find the best correlations for all senior events. The model (1) used for family optimization is also used here. This model, again, allows selection of the best set of correlations by considering all combinations of them and by finding the most consistent. Solution to this model is described above.

STEP #4

This step involves decoding correlations for all remaining events. Once the correlations for senior events are determined in Step 3, they induce correlation selection at all lower levels, since conditional correlations have already been determined in Step 2. Step 4 thus finishes the determination of displacements. The dip angle and directions are computed using the known formulas of analytical geometry.

One note should be added here. As it can be seen from the description of the algorithm, the dips are determined for events of all sizes and all levels of enclosure (levels in the event tree) simultaneously. In fact, the information from all levels is used to help the algorithm decide the correct correlation selection. Geologically, this can be regarded as a simultaneous computing of structural and stratigraphic dip information at all possible levels. Graphically all this information can be presented in one plot, as described below.

EXAMPLES

The example in FIG. 12 shows the presentation of dipmeter results computed using the algorithm. Track 1 contains the two calipers and the drift angle and direction, which is indicated in the same manner as the dip angle and direction. As in the standard dip arrows plot, dip angles and directions are shown in the track 2 using circles with arrows. The position of the circle in the horizontal extent of the track indicates the dip angle, and the direction of the arrow indicates the down dip direction.

Important features of this presentation are the profile curves with events and correlations indicated on them and the corresponding dip arrows of varying sizes. Represented in the track 3, events are indicated with thin lines, the midpoint of an event being taken as the representative point for this event. From this point, connected lines with arrows are drawn to the other curves. These lines show the direction of matching. Since the events are meaningful to the eye, the visual check of the correctness of the basic correlations can be performed even by a person unfamiliar with details of dipmeter processing.

Many events are enclosed within each other. This corresponds to more gross bedding and to finer interbedding within it. Accordingly, dips from thicker beds, or poly anomalies, can be interpreted as structural, while dips coming from thinner beds within them as a stratigraphic. In the plot these dips can be distinguished by the size of the dip arrows. Dips from thickest beds are indicated by dip arrows of standard size. Dips from beds of the second level of enclosure are shown by the arrows that are half the size; dips from the next level of enclosure are again half that size, and so on. Because of the scale limitations of the plotter, the smallest size of the dip arrow is limited to be eight times smaller than the standard size. It should be noted that the dip corresponding to any given event can be found at the depth of the midpoint of this event; this depth is indicated by the correlation line starting from this midpoint.

The example in FIG. 13 shows an interval of a computed dipmeter log, where, due to a number of specific curve characteristics, one can see a number of enclosed beds of different levels with corresponding variations in dip arrow sizes. One may notice that the direction of dipping in the interbedding may agree or disagree with the dip direction in the enclosing bed. From analysis of displayed correlation lines, differing conclusions may be drawn for specific cases. The agreement may indicate both the stable character of the deposition and the precise character of the recording; logging speed was constant, all sensors functioned correctly. The disagreement also has to be interpreted. If unrelated to tool recording problems, it shows the actual direction of interbedding inside larger structures, thus providing important stratigraphic information.

The example in FIG. 14 is a comparison between the results of the fixed interval correlation method and the new algorithm. One can see that the dip progression resulting from the new algorithm is more precisely delineated. All repetitive correlations resulting from overlapping in the fixed interval correlation method are eliminated.

The differences between the two plots in FIG. 14 can be analyzed using the presentation of the new results showing profile curves and correlations between them. Consider for example, the interval from XX70 to XX80. The fixed interval correlation results show a group of very low angle dips which is not present in the results of the new algorithm. The check is accomplished using the expanded plot in FIG. 15. The event which produces miscorrelations in the fixed interval correlation method is marked in this plot with a thick line 50. This correlation however, is caused by the similarity in general shape only, and analysis shows that it is incorrect. It is repeated a few times because of overlapping correlations intervals.

Checks similar to the above confirm that all discrepancies in the two plots in FIG. 14 are resolved in favor of the new method.

FIG. 16 contains an example of dipmeter computation where sandbars have been suspected. Computations have proved this suspicion to be true. An additional interesting feature may be noticed in this example. High variation in the profile curves indicates significant interbedding. This interbedding may be regarded as producing stratigraphic information even though few dip arrows of smaller sizes are indicated. This example illustrates the capabilities of this new method in a case of thin beds.

DESCRIPTION OF ALGORITHM

Figure 17:
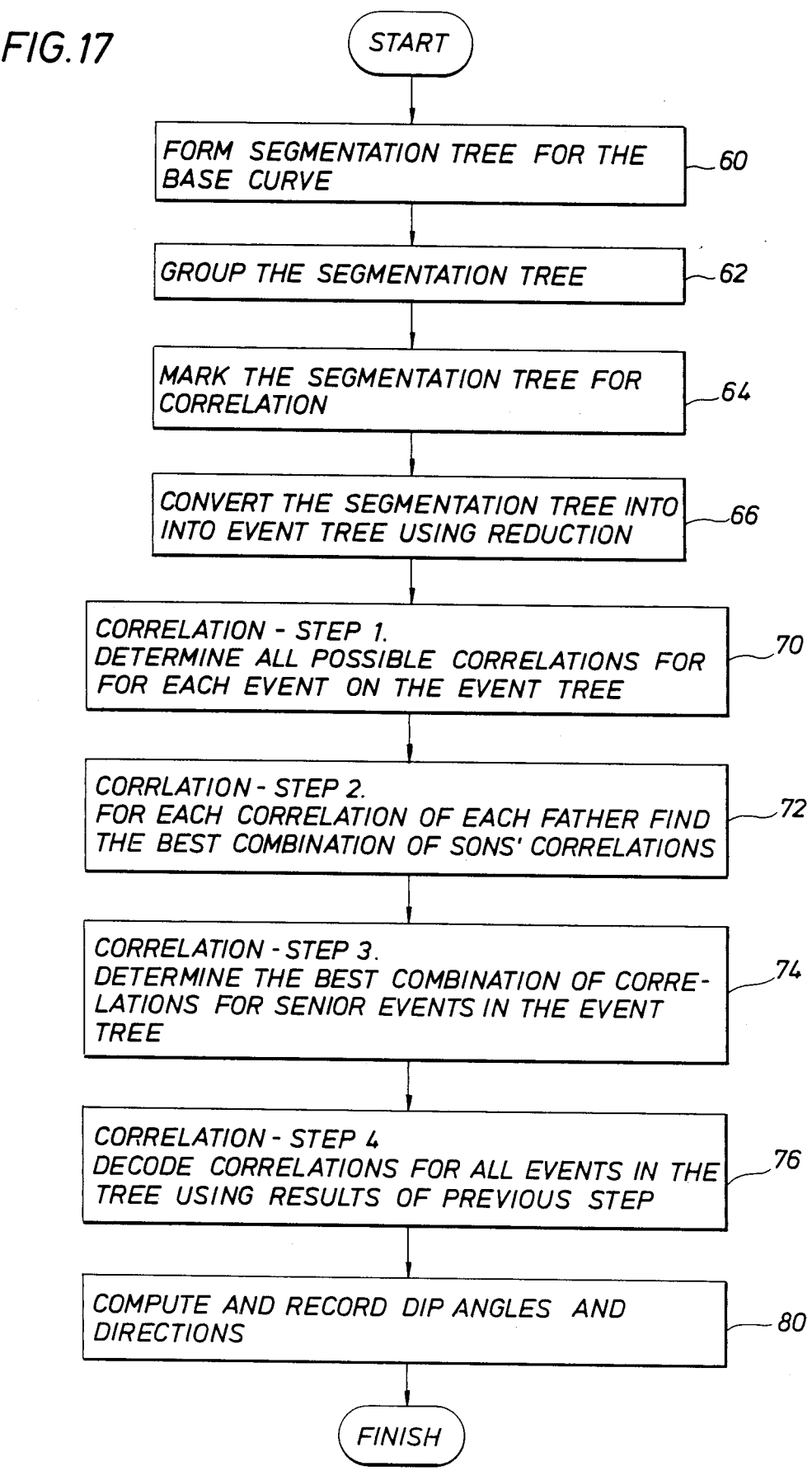
FIG. 17 is a flow chart for implementation of the algorithm of the present disclosure.

In general terms, all of the foregoing is accomplished by an algorithm having the flow chart illustrated in FIG. 17. Beginning with the initial input of data, the algorithm is divided into two portions, the first being directed to breaking the respective curve up into segments. The first several steps relate to the segmentation tree while the last several steps relate to correlation.

The step 60 converts the curve into a segmentation tree as exemplified hereinabove at FIG. 1 and following. The curve is thus defined by a number of segments at multiple levels, three levels being exemplified in this example. The various curve minima are thus found and connected with a first line and then minima in that first line are located and connected with a double line, etc. until the several levels of minima are defined.

The next step is identified at 62 and this involves defining certain groups in the segmentation tree. This regrouping is exemplified at FIG. 5. This is accomplished by considering adjacent or connecting groups including father and son groupings. This is also accomplished by performing area comparisons as exemplified at FIG. 7.

The third step 64 in this sequence is to mark events that are possible candidates for correlation. To do so implies that certain events will be discarded. An example is shown in FIG. 10 above. Marking generally is done by comparing areas. Typically, the area of the node is measured along with the area of all its sons. This summation is a preliminary. If the area of the node by itself is greater than the area of its sons, the event is considered as a whole. Possibly it will be reevaluated later when specific sons are evaluated.

The next step 66 in the algorithm is to reduce or eliminate nodes of the segmentation tree that are not needed for correlation. After this pass, the segmentation tree is then called an event tree. An example of such reduction is shown in FIG. 7 of the drawings. This then prepares the data representing the event tree for correlation described in the sequence of four steps 70, 72, 74 and 76 and these steps are illustrated in FIG. 17. After correlation has occurred, the actual dip is computed in step 80 and the data is then presented on a suitable graphic basis.

The results of the implementation of the new dipmeter correlation techniques prove the validity of an approach based on event detection and correlation. The formal techniques for implementing these steps are based on the use of segmentation trees and on hierarchial multilevel optimization. The multilevel event structure used in the algorithm corresponds to multilevel stratification taking place during deposition. The use of this correspondence allows the correlation algorithm to produce structural and stratigraphic dip information in one pass and to present it in one plot, supported with a display of events and correlations.

While the foregoing is directed to the preferred embodiment, the scope thereof is determined by the claims which follow.

I claim:

1. A method of correlating a pair of dipmeter curves comprising the steps of:
   (a) defining a segmentation tree for one of a pair of dipmeter curves;
   (b) converting segmentation tree into an event tree by deleting curve events falling outside an event criteria;
   (c) determining correlation coefficients between the pair of curves using said event trees;
   (d) optimizing the correlation coefficient between the curves to obtain correlation; and
   (e) determining formation dip from the correlated curves.

2. The method of claim 1 wherein the step of defining a segmentation tree includes the steps of locating minima in the curve, drawing straight line segments between such minima to define a first level of segmentation, defining minima in the straight line segments and drawing straight lines therebetween to define a second level of segmentation and extending the segmentation to a designated number of levels.

3. The method of claim 2 wherein the minima define a segmentation tree representing the curve, and the tree data is stored.

4. The method of claim 3 wherein the step of converting the segmentation tree into an event tree limits curve events to those defined event criteria including a specified minimum and maximum curve excursion.

5. The method of claim 4 wherein the minimum and maximum curve excursion represent minimum and maximum geological bed thickness.

6. The method of claim 1 including the step of obtaining a dipmeter curve with respect to conductivity and inverting the curve prior to defining a segmentation tree therefrom.

7. The method of claim 1 wherein step (a) includes the step of defining an event on the curve, detecting subevents in that particular event, measuring the area of the event after segmentation, measuring the areas of the subevents after segmentation, and comparing the summed areas of the subevents with the area of the event to determine the necessity of further subevent segmentation.

8. The method of claim 7 including a subsequent step of joining into a single segmentation tree adjacent subtrees along the curve.

9. The method of claim 1 including the further steps of obtaining four curves from the use of a dipmeter in a well borehole, and each of the four curves is converted into a segmentation tree, and further wherein dip is determined for different pairs of the four curves.

10. The method of claim 1 wherein events along a dipmeter curve are determined relative to well borehole depth.

11. The method of preparing dipmeter curve data for correlation comprising the steps of:
    (a) defining a segmentation tree for one a pair of dipmeter curves;
    (b) converting the segmentation into an event tree by deleting curve events falling outside an event criteria;
    (c) determining correlation coefficients between the pair of curves using said event trees; and
    (d) optimizing the correlation coefficient between the curves to obtain correlation.

12. The method of claim 11 wherein segmentation trees are made for dipmeter curves along a common well borehole as a function of depth and including the step of performing analysis of correlated events to determine formation dip.

13. The method of claim 12 and further including the step of storing tree data in a memory device.

* * * * *